United States Patent
Brevoort et al.

(10) Patent No.: US 11,455,166 B2
(45) Date of Patent: Sep. 27, 2022

(54) HOSTING EVENT-BASED APPLICATIONS

(71) Applicant: Slack Technologies, Inc., San Francisco, CA (US)

(72) Inventors: Michael Brevoort, Littleton, CO (US); Angela Kirchhof, Denver, CO (US); Helen Wei Zeng, San Francisco, CA (US); Curtis Neil Allen, Jr., Denver, CO (US); Stephen Wood, Mill Valley, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/186,854

(22) Filed: Feb. 26, 2021

(65) Prior Publication Data
US 2022/0276859 A1    Sep. 1, 2022

(51) Int. Cl.
 *G06F 9/44* (2018.01)
 *G06F 8/70* (2018.01)
 *G06F 9/54* (2006.01)
 *G06F 8/60* (2018.01)
 *H04L 51/046* (2022.01)

(52) U.S. Cl.
 CPC .......... *G06F 8/70* (2013.01); *G06F 8/60* (2013.01); *G06F 9/542* (2013.01); *H04L 51/046* (2013.01)

(58) Field of Classification Search
 CPC ... G06F 8/70; G06F 8/60; G06F 9/542; H04L 51/046

USPC .......................................................... 717/120
See application file for complete search history.

(56) References Cited

U.S. PATENT DOCUMENTS

| | | | |
|---|---|---|---|
| 9,262,238 B2 * | 2/2016 | Kunze | G06F 9/542 |
| 10,331,303 B1 * | 6/2019 | Gurtin | G06F 3/0482 |
| 2016/0124742 A1 | 5/2016 | Rangasamy et al. | |
| 2016/0255139 A1 * | 9/2016 | Rathod | H04L 67/42 |
| | | | 709/203 |
| 2018/0287982 A1 | 10/2018 | Draeger et al. | |

OTHER PUBLICATIONS

"Die, Email, Die! A Flickr Cofounder Aims to Cut us all Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Chuck O Kendall
(74) *Attorney, Agent, or Firm* — Erise IP, P.A.

(57) ABSTRACT

Media, methods, and systems are disclosed for hosting an event-based application. Application instructions corresponding to processing steps to be performed in response to particular events are received from a development environment. The events are associated with a group-based communication channel. An application comprising computer-executable instructions is generated based on the application instructions and metadata associated with the events. In response to detecting one or more of the events, execution of the computer-executable instructions is triggered. A response is received corresponding to output from applying the processing steps to the events. A message is posted into the respective communication channel corresponding to the response.

20 Claims, 7 Drawing Sheets

(56) References Cited

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking up the Slack", Tedium, [online][retrieved May 9, 2019], Retrieved from the Internet: <URL: https://tedium.co/2017/10/17/irc-vs-slack-chat-history/>. (dated Oct. 17, 2017) 13 pages.
Internet Relay Chat, Widipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?content=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
WIPO Application No. PCT/US2021/052005, International Search Report and Written Opinion of the International Searching Authority, dated Jan. 4, 2022.
Build the art of crafting a Slack app your team will love; https://web.archive.org/web/20201203090146if_/https://slack.dev/guides/Build.pdf; Dec. 3, 2020.
Workflow Builder Steps from apps; https://web.archive.org/web/20201030182532/https://api.slack.com/workflows/steps; Dec. 4, 2020.

* cited by examiner

HOSTING EVENT-BASED APPLICATIONS

TECHNICAL FIELD

Embodiments of the invention relate to hosting event-based applications. More specifically, embodiments of the invention relate to enabling deployment and hosting of event-based applications in connection with group-based communication systems.

The development, deployment, and hosting of event-based applications that work in connection with group-based communication systems has traditionally required a substantial amount of software development experience and domain specific knowledge regarding application hosting. Such domain specific knowledge includes knowledge of an application programming interface of the group-based communication system, how to deploy and host an event-based application, and the complexities associated with network connectivity between the group-based communication system and an application execution environment onto which the event-based application is deployed. As a result, building, running, and maintaining a group-based communication system application requires an experienced software developer with knowledge of the group-based communication system as well as knowledge regarding application deployment and hosting. This results in significant barriers to entry to associated development platforms.

What is needed is a user-friendly platform for enabling deployment and hosting of event-based applications in connection with group-based communications systems. Such a platform allows users without domain-specific knowledge to deploy and host event-based applications into an application execution environment and thereby reduces the above-described barriers to entry.

SUMMARY

Embodiments of the invention address the above-identified problems by providing a platform to build, run, deploy, and maintain event-based applications in connection with one or more group-based communication systems. In particular, in a first embodiment, the invention includes one or more non-transitory computer-readable media storing computer-executable instructions that, when executed by a processor, perform a method for hosting an application in connection with a group-based communication system, the method comprising: receiving, from a development environment, application instructions and application configuration parameters associated with the application corresponding to processing steps to be performed in response to a plurality of events, and in response to detecting the one or more events of the plurality of events in the respective group-based communication system channel of the group-based communication system: triggering execution of the computer-executable instructions based on metadata associated with the one or more events, posting, in the respective group-based communication system channel, a message based on a response responsive to the one or more events.

In a second embodiment, the invention includes a method for hosting an event-based application in connection with a group-based communication system, the method comprising: receiving, from a development environment, application instructions and application configuration parameters associated with the application corresponding to processing steps to be performed in response to a plurality of events, and in response to detecting one or more events of the plurality of events in a group-based communication system channel of the group-based communication system: triggering execution of computer-executable instructions based on metadata associated with the one or more events, posting, in the group-based communication system channel, a message based on a response responsive to the one or more events.

In a third embodiment, the invention includes a system comprising at least one processor and at least one non-transitory memory storing computer executable instructions that when executed by the processor cause the system to carry out actions comprising: receiving, from a development environment, application instructions and application configuration parameters associated with the application corresponding to processing steps to be performed in response to a plurality of events, and in response to detecting one or more events of the plurality of events in a group-based communication system channel of the group-based communication system: triggering execution of the computer-executable instructions based on metadata associated with the one or more events, posting, in the group-based communication system channel, a message based on a response responsive to the one or more events.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
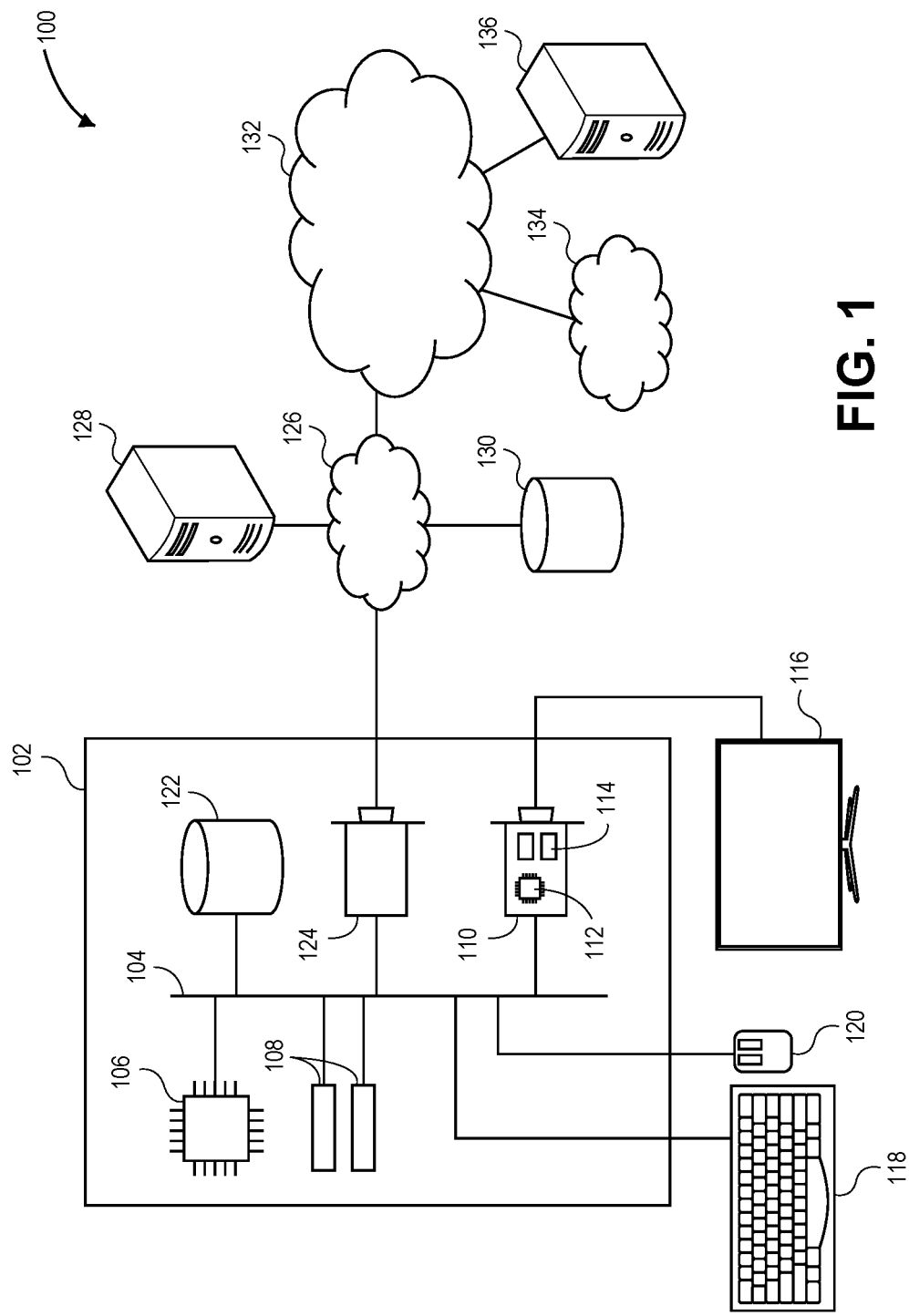
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

In order to expand the functionality of a group-based communication system event-based applications are developed to integrate group-based communication system functionality with external platforms. In some embodiments, an event-driven application development and hosting platform is provided. Application developers author code to build and host applications in connection with the group-based communication system. In some embodiments, a command line interface is provided for developers to quickly create cloud-based, event-driven applications that are then deployed to an application execution environment associated with the group-based communication system.

In some embodiments, the event-driven application development and hosting platform can be utilized in connection with a workflow builder user interface to build an event-based application without the need to author program code. In such embodiments, an event-based application may be built by a user that understands a workflow, but does not have training or otherwise does not wish to author code. In other embodiments, aspects of the event-driven application development and hosting platform are provided to trained software developers, who implement an event-based application by authoring code to implement the application logic.

In some embodiments, a set of application development tools are provided in the form of a command line interface (CLI). This CLI provides functionality to authenticate a developer's identity to the application development platform. In one embodiment, the developer invokes the CLI with a parameter of "whoami" to determine whether the developer has been previously authenticated. If the developer has been previously authenticated as a particular user, the CLI with the "whoami" parameter will return a username which is already authenticated. If the developer has not been previously authenticated, the CLI may provide an error message to the effect that the CLI session has not been authenticated.

The developer may then invoke the CLI with a parameter of "login" to provide authentication credentials or "logout" to log out of the CLI session. In this embodiment, when the developer invokes the CLI with the "login" parameter, the CLI generates a command that can be cut and pasted to be executed in an authenticated session of a group-based communication system. The generated command includes a ticket, which includes a unique, random number expressed as a hexadecimal string that is valid only for a number of minutes. When the developer pastes the generated command into the authenticated client interface of the group-based communication system, authentication tokens are generated that are used to authenticate the hosted application both for deployment as well as execution.

Once a developer is authenticated, the developer can build a project from scratch, check out a project from a source code repository, or use the CLI to populate a predefined project skeleton. A predefined project skeleton is based on a pattern of different types or categories of applications that a developer is likely to need to build. In some embodiments, a suite of predefined project skeletons are made available through the CLI by a provider of the application development platform. A developer can initiate a command through the CLI to build a skeleton app corresponding to the general type of app the developer is intending to build. From there, the developer can edit and extend the skeleton app to build out the specific functionality specified in the requirements of the application on which the developer is working.

In one embodiment, to initialize a new empty project, the developer invokes the CLI with a parameter of "new." This creates the most basic application framework with a set of minimal initialized configuration files and source code files containing example code, which is commented out in some embodiments. In some embodiments, the development environment is Node.js, with configuration files being provided in a human-readable data serialization language format such as YAML. In some other embodiments, alternative programming languages are provided such as Python or Golang.

Once the developer has edited the configuration files and added and/or updated code in the source code files, the developer may deploy and run the application to the event-based application hosting environment. In some embodiments, the developer invokes the CLI with the CLI parameter "deploy" to deploy the application to the application execution environment associated with the hosting environment. In some embodiments, the developer may view logs associated with the CLI by invoking the CLI with the parameter "activity." In some embodiments, a chronologically most recent portion of the logs can be viewed in connection with the CLI parameter "activity—tail." Once deployed, the application functionality is operable in the group-based communication system user interface corresponding to the group-based communication system associated with the runtime environment to which the application was deployed. In some embodiments, the application can be undeployed or removed from the execution environment using the CLI parameter "delete." In this embodiment, the parameter "delete" does not delete the configuration and source code from the developer's development environment but rather un-deploys it from the application execution environment.

Such deployed applications may both implement group-based communication system application functions as well as invoke group-based communication system application functions associated with other deployed applications. In some embodiments, such an application function is an atomic piece of application logic that can be reused. Broadly speaking, a function defines inputs, outputs, includes application logic to generate the outputs from the inputs. In some cases, functions additionally perform certain specified functionality (also known as "side effects") in addition to generating the outputs. For example, a function post_message( )may have inputs including a message, a channel identifier and a user identifier. The function application logic has a side effect of posting the provided message, attributed to the indicated user, in the indicated channel, in the return values of "success" and "failure" indicating whether the message was successfully posted.

Generally, a function receives inputs and in response to these inputs, generates either of an error or outputs. The inputs may include any of one or more arguments for the function, a name of the function, and other suitable information used to perform the function. The error may be generated in response to a failure of the function. For example, if a required argument is not provided within the inputs, the function may fail and generate an error. The error may be returned to the group-based communication system server and displayed as an error message on a client device associated with the group-based communication system. Alternatively, outputs may be generated by the function in response to a successful execution of the function. In some embodiments, the outputs (and/or the error) may generate a success event (or, in the case of an error, a failure event) on an event channel in the group-based communication system, allowing users or automated processes to obtain results. As discussed below, this also allows functions to be composed by having an event on the event channel to serve as a trigger condition for another function.

Alternatively, or in addition, in some instances, either of the outputs or the error may be sent directly to a subsequent function as input arguments for the subsequent function. In some embodiments, the inputs may be received as arguments to the function. Further, inputs may be received from the group-based communication system as message or event information. In some embodiments, an undercurrent of data may be associated with a particular channel of the group-based communication system. The undercurrent of data includes various information associated with the group-based communication channel, such as, for example, metadata for messages posted within the channel, user information associated with users added to the channel, and channel information, such as the channel name and channel parameters. Accordingly, any of the information from the undercurrent of data may be sent as an argument for the function. For example, a username and a time for a message may be used as arguments for a function to indicate which user sent the message and the time that the message was sent. For example, a function is contemplated that identifies the last user to post a message within the channel.

In some embodiments, it may be desirable to utilize existing resources associated with the group-based communication channel for the function. For example, channel related information and features such as access control, data scoping, subscriptions, application programming interfaces (API), data loss prevention integration, encryption key management, and international data residency integration may be called upon by the function to provide arguments or triggering events to initiate the function. Accordingly, the existing group-based communication channel may be used as an event channel for the function, where events within the channel may trigger functions, such as, for example, sending a message, adding a user, or reacting to a message. In some embodiments, any content published to the group-based communication channel may be used to trigger and supply arguments to a function.

In some embodiments, events may be published as event messages within a channel of the group-based communication system, where each event message comprises metadata describing the event. Accordingly, functions can be triggered based on events within the channel, as well as when an event message is reacted to or commented on. In some such embodiments, it may be desirable to publish event messages such that the metadata associated with the event message may be used to initiate and supply information to a function. Alternatively, in some embodiments, it may not be desirable to publish all events as event messages within the channel, as doing so might cause users to receive too much unnecessary information. Accordingly, event messages may be filtered such that only certain types of events are published as event messages. Alternatively, event messages may be published to the undercurrent of data for the channel without being visible within the channel to users.

In some embodiments, the function is an object in the context of the group-based communication system, such as an object within an object-oriented programming environment. Accordingly, the function may be stored within a memory, such as a group-based communication system data store and associated with an identifier used to identify the function. Further, in some embodiments, the function may be authenticated by any of the group-based communication system or an external application. In some embodiments, the function may be authenticated in one authentication step that meets the authentication requirements of each of the group-based communication system, and the external application. Additionally, the function may be authenticated along with a user who initiated the function. Accordingly, embodiments are contemplated where a user is authenticated by the group-based communication system and the user does not need to perform further actions to be authenticated by an associated external application. Here, information relating to user authentication may be sent as an argument for the function, by way of a bearer token, for example. As such, if the user is authenticated within the group-based communication system then the user can run a function in connection with an external application. A built-in function is an extension of the core functionality of the group-based communication system, a standard interface to the core API of the group-based communication system.

In some embodiments, a workflow builder user interface is provided so that users of a group-based communication system can build and extend event-based applications without authoring code. The workflow builder user interface may be used to automate processes into automated workflows in a group-based communication system. Workflows may be of an arbitrary complexity and may integrate with third-party applications and services. In the context of a workflow, a trigger is what initiates a workflow. Triggers may be automatically generated in response to arbitrary events in the group-based communication system matching pre-specified conditions. Triggers may also be manually initiated, for example by way of a user of a group-based communication system interacting with a shortcut menu that when selected will launch a workflow. In some embodiments, a shortcut menu may be accessed from a menu in a group-based communication system channel.

A workflow may incorporate workflow steps. A workflow step is a unit of execution that performs an action such as sending a group-based communication system message or causing a custom form user interface component to be presented to a user of a group-based communication system. The execution logic corresponding to a workflow step may be exposed from within group-based communication system applications to integrate a particular workflow with external systems (for example, by way of an API for example). When a user building a workflow inserts a step, the workflow-building user may configure one or more parameters to pass along information to entered by end users of the workflow. The workflow-building user may employ a configuration modal dialog box to configure such behavior within the workflow. The configuration modal dialog box contains a set of fields. Each field in the configuration modal dialog box allows the workflow-building user to define a source for the input data that the workflow will consume as input. In some embodiments, the workflow-building user may insert variables surrounded by double curly brackets "{{variables}}" into a plain-text field to auto-populate output data from previous workflow steps.

In some embodiments, row-based and column-based objects are provided for persisting data in connection with an event-based application consistent with the present invention. In these embodiments, metadata associated with a data dictionary corresponding to the persisted data can be provided in the configuration files of the event-based application. In an exemplary embodiment, a table name is provided in the YAML configuration file followed by a list of columns with a column name and a standard data type corresponding to each of the columns. In some embodiments, the standard data types include: (i) type "id" which is a string that uniquely represents a particular row in the persisted data; (ii) type "text" which corresponds to a UTF-8 encoded string of an arbitrary length; (iii) type "user" which corresponds to a uniquely defined user identifier corresponding to a user of a group-based communication system; (iv) type "channel" which corresponds to a channel in the group-based communication system; (v) type "date" taking the form of an ISO 8601 formatted string; and (vi) type "number" which corresponds to an integer or floating point number.

In some embodiments, data can be persisted and queried in connection with the data persistence service by making API calls to an API that is provided in connection with code provided with the initial skeleton application provided by the application development platform. The data persistence API may contain the below-described methods, which in some embodiments bear the prefix "apps.hosted.tables." One method, named "putRow," may be invoked to create or update a row when providing a table name and an object mapping of column name to value. If a row having an "id" value corresponding to the "id" in the provided object mapping, does not exist, a new row may be created. If a row having the corresponding "id" value already exists in the persistent storage, the row having that "id" will be updated according to the values contained in the rest of the object mapping.

Another method, "getRow" may be invoked to retrieve a single row when given a table name and an "id" corresponding to the row that should be retrieved. Yet another method that may be provided is "deleteRow," which deletes a single row, given a table name and a row "id." Still another method is "query," which may be invoked to query a particular table and return a certain number of rows. The query expression may be any kind of a query term that can be used to query a database, such as a query term that can be used to query a SQL or NoSQL-type database. In some embodiments, there is a user interface component for interacting with and administering data that is persisted in the above-described manner.

Various categories of users and organizations interact with exemplary event-driven applications and associated application development, deployment, and hosting environments in several ways. The various types of users and organization include (but are not limited to): (i) end users of a group-based communication system, (ii) workflow users who use pre-built workflows associated with group-based communication systems; (iii) workflow-building users who build workflows to perform automated functionality within a group-based communication system; (iv) users who customize group-based communication system functions and configure associated triggers; (v) subscribing organizations of group-based configuration systems that develop event-based applications by way of group-based communication system functions to support automation required by the subscribing organization; and (vi) partner organizations that develop event-based applications and integrations to operate in connection with group-based communication systems.

As a non-limiting example, an end user of a group-based communication system in the course of using the group-based communication system may use a group-based communication system channel with interactivity to provide feedback regarding a particular product. In so doing, the end user decides that the end user would like to create a similar feedback flow for other end users and other products. Using the group-based communication system, the end user looks for a way to copy or use the same or similar workflow. In this capacity, the end user becomes a workflow user, who may wish to customize an existing workflow. Within the group-based communication system client interface, the end user turned workflow user begins a process of customizing the existing workflow. The workflow user adds a solution based on an existing workflow and customizes the new solution. The workflow user may then add the customized solution to a particular group-based communication system channel. The workflow user may then send a message in-channel to let channel members know about the new solution.

Channel members may provide comments regarding the new solution, and based on those comments, the workflow user may update workflow solution configuration by, for example, updating a question in a feedback form associated with the solution.

In another example, while using a group-based communication system, a workflow user may directly have the requirement for the workflow user's team to have a way to review contracts. In this example, the workflow user may browse the available workflows to determine whether an existing workflow can be configured to be used by the team to review contracts. If an existing workflow can simply be configured to allow this, the workflow user may configure and add a solution as described above. Alternatively, the workflow user may determine that no existing workflow exists to meet the needs of reviewing contracts. At this point the workflow user may decide to build a suitable workflow, and the workflow user takes on the role of workflow-building user. In this case, the workflow-building user will open the workflow builder user interface and initiate the process of creating a new workflow. In some embodiments, not all users have authorizations to create new workflows, and an administrative user of the group-based communication system may have to grant permissions to the workflow-building user to create a new workflow.

Once the workflow-building user has initiated the process of creating a new workflow in the workflow builder, the workflow-building user may browse workflow templates to determine whether an existing workflow template exists to use as a basis to build the new workflow. If a template exists, the workflow-building user may open the template, add, modify or delete workflow steps, and define required inputs. If a template does not exist, the workflow-building user may opt to build a workflow from scratch by adding workflow steps as needed and defining required inputs. In either case, the workflow-building user should then test the newly created workflow by running the workflow and observing execution based on a suite of test inputs. Finally, depending on administrative configuration, the workflow-building user may choose to publish the workflow for some or all users of the group-based communication system to use.

As a third example, a power user of a group-based communication system may encounter a requirement to initiate a technical support incident with a support ticket tracking system if an error rate in a supported technical platform exceeds a certain error rate threshold. One option for the power user would be for the power user to browse available workflows and add a solution if such a solution exists already in the group-based communication system. As described above, this may involve simply customizing a workflow as a workflow user or it may involve building a workflow from scratch or based on a workflow template. If no such workflow functionality exists, the power user may determine that it is necessary to write code to implement a new event-based application.

In this case, the power user browses group-based communication system functions either in the workflow browser or in a function browser or other source of function description documentation. Function description documentation should provide a name of a function and a description of inputs and outputs so that the power user, acting as a software developer writing code, can write software code to access the group-based communication system function. In some embodiments, using a function browser user interface associated with the group-based communication system, the power user identifies a function entitled "Start Incident" that appears to provide necessary functionality to initiate a technical support incident consistent with the power user's requirements, In some embodiments, using the function browser user interface, the power user select an option that allows the power user to request permissions to build an application using the identified function. In this embodiment, an administrative user reviews the request and decides whether to grant the power user permissions to build such an application.

If permission to build the application is obtained, the power user takes on the role of developer and, within an application development environment, uses a CLI as described above to initialize a new application skeleton. Next, the developer determines whether an existing trigger may be leveraged. If no existing trigger is suitable, the developer creates a new trigger. In the example of initiating a support incident when an error rate in a supported technical platform exceeds a certain error rate threshold, the trigger may be the occurrence of an error rate above the predefined error rate. Next, the developer configures the application and writes code necessary to invoke the function. In some embodiments, the developer optionally writes code iteratively and tests the application locally within the development environment. Once the developer is ready to test the application in a hosted application execution environment, the developer may use the CLI to deploy the application to the application execution environment. Once the application is deployed, the developer may create an associated workflow that connects a trigger to a function in the deployed application. The developer may then configure an associated trigger (setting the error threshold, for example). In this example, the application is now live and when an error exceeds the configured threshold a support incident will automatically be initiated.

Within an organization that uses a group-based communication system, there may arise a requirement to manage different types of incidents. For example, physical security, emergencies, engineering support issues, and change requests may all be incidents to be managed separately. An organizational user may search available functions from third-party partners to the operator of the group-based communication system to determine whether any functions are available from third parties who provide integrations with an incident management system (or incident management systems) used by the organization. In some cases, an existing application will exist in a published application directory. If this is the case, the organizational user can browse the functions and other published documentation regarding the functions exposed by the published application. The organizational user may have to obtain requisite permissions to initiate a new application or to otherwise create a workflow and configure a trigger as described above. In this case, given permissions, the organizational user can configure the group-based communication system to use the third party published application to integrate with the incident management system according to the organization's requirements.

On the other hand, if no suitable third-party partner integration exists, the developer may choose to implement the integration directly. In this example, the developer would request administrative permissions to build an application implementing a new function to carry out the integration. In this embodiment, an administrative user reviews the request and decides whether to grant the developer permissions to build such an application implementing the specified function.

If permission to build the application is obtained, within an application development environment, the developer uses a CLI as described above to initialize a new application skeleton. Next, in this example, the developer creates an "Alert User" function that contacts a user to be notified until the user to be notified acknowledges the incident or the incident times out. In this example, the developer also creates a "Start Incident" function. The developer then creates a new configurable trigger and deploys the application to a hosted application execution environment. In some embodiments, the developer may configure the developed group-based communication system function to be reusable (given proper permissions) within the developer's organization.

Finally, third-party partners of operators of group-based communication systems may wish to drive adoption of the partners' platforms by an existing user base of users of the group-based communication system. To drive such platform adoption, a partner may choose to develop and maintain an event-based application hosted by the operator of the group-based communication system. The partner may receive requests from its customers to utilize the partner's platform from a client interface of the group-based communication system. For example, in the case of a partner who is a provider of an incident management system, the partner may have the requirement that its customers want to trigger, escalate, and resolve incidents from the client interface of the group-based communication system.

In this example, a partner developer creates an application that is the official partner branded application for providing an integration with the partner's application and/or platform. The partner user creates a configuration step to authenticate the group-based communication system to the partner's application and/or platform. Next the partner developer creates a configuration step to map a particular group-based communication channel to an application component such as, in this example, a group of users to be notified regarding a support incident. Next, the partner developer creates an integration function to implement integration with the partner's application and/or platform using, for example, an API exposed by the partner's application and/or platform. In some embodiments, the function is hosted by the group-based communication system operator. In some other embodiments, the integration function is hosted remotely for example in connection with a public or private cloud platform or in a data center maintained by the partner. In some embodiments, the partner developer configures the function to be public and reusable and publishes it to a public or private application directory.

To secure access to sensitive information associated with an event-based application running in connection with a group-based communication system, a rich set of administrative functionality is advantageous. Hosted applications and corresponding functionality that may be utilized by a broader set of users bring about potential data governance concerns, as providing additional data access and other functionality increases complexity of the overall group-based communication system, thereby raising potential issues regarding data security and compliance.

In some embodiments, administrative users of a group-based communication system are able to manage roles corresponding to groups of users that are authorized to develop, deploy, configure, modify and use applications hosted in connection with group-based communication systems. Administrative users may specify which users are able to host applications in connection with a particular organization's group-based communication system. Administrative users may allow a group or groups of users to develop and deploy hosted applications in a safe, sandboxed environment without fear of data traveling outside the organization's boundaries. In some embodiments, test data associated with a sandbox environment will be random data or data that is otherwise sanitized and de-identified of personally identifiable information or other sensitive information. Administrative users may grant a group or groups of users "trusted" permission to deploy hosted applications that are capable of communicating with systems that are external to a group-based communication system, such as an organization's internal on-premises enterprise applications or with other third-party, external systems. Furthermore, administrative users can themselves assign a group or groups of users to be application hosting and/or application development platform administrators.

In order to control data egress, administrative users can control which applications have the capability to make external API calls out to various destinations. These destinations include a particular organization's internal, on premise systems and other third-party, external systems. Administrative users can specify a list of group-based communication system OAuth scopes that are allowed for use in a particular organization's hosted applications. Administrative users can limit where a particular organization's hosted functions and/or triggers can be made available to external organizations. Administrative users can limit which group-based communication system workspaces within a particular organization has access to specified hosted applications. In some embodiments, administrative users may define required fields and values in the application configuration metadata of hosted applications to ensure that access control measures are not circumvented. For various types of hosted applications, administrative users can choose whether a particular hosted application should undergo validation before the hosted application is deployed.

Administrative users may have visibility into and a capability to monitor a number and type of hosted applications, functions, and/or triggers a particular organization is hosting as well as respective owners and/or collaborators who have access and authorization rights to particular applications, functions, and/or triggers. Administrative users may audit the external functions and/or triggers that their organization is using as well as log data regarding inputs, outputs, and state. Administrative users may detect and audit configuration changes to a particular organization's hosted applications. Administrative users may investigate resource consumption and gain insight into how much a particular hosted application costs the organization to host. Administrative users may monitor usage and associated resource consumption of each hosted application and/or function. Administrative users may limit whether a particular organization's triggers may be invoked from a particular webhook. Administrative users may audit which external endpoints a particular organization's applications, functions, and/or triggers have called out to. Administrative users may audit which core group-based communication system API endpoints a particular organization's functions have made calls out to. Administrative users may detect and audit changes to hosting roles and permissions. Administrative users may access source code on which a particular hosted application is based as well as respective source code control change history. Data governance principles are applied such data storage practices are compliant with a particular organization's compliance standards such as enterprise key management and international data residency.

Administrative users may grant to developers hosting-specific roles. Such roles correspond to a set of features that a particular developer can incorporate into the developer's hosted applications, functions, and/or triggers. In some embodiments, administrative users may create new hosting permission roles and specify granular feature availability for the new hosting permission roles. In one embodiment, three discreet roles are provided: basic, basic-plus-storage, and trusted. The basic hosting permission role does not allow data storage. Applications assigned to the basic role (basic applications) may call built-in group-based communication system functions and group-based communication system functions hosted by the same organization. The basic role may not call out to external APIs. Functions implemented and exposed in applications assigned to the basic role can be called by group-based communication system workflows and other group-based communication system functions hosted by the same organization. Basic applications may not themselves be called by group-based communication system functions owned by external organizations, and functions associated with basic applications may not be called by a webhook that a basic application implements. Applications that are assigned to the basic plus storage role have the same characteristics as basic applications with the exception that they may store data. Applications that are assigned to the trusted role (trusted applications) may store data and call and be called the same as a basic application. In addition, trusted applications may call out to external APIs. Trusted applications may also be called by group-based communication system functions owned by external organizations (implementing any necessary authentication and authorization). Functions associated with trusted applications may also be called by a webhook that the trusted application implements.

In some embodiments, when a developer attempts to deploy an application with features that are not authorized due to role-based authorization constraints configured in the application development environment or due to otherwise implemented organizational rules, an error may be returned to the developer, and the application will not be deployed. In some embodiments, a basic application may call a function exposed by a trusted application. In this embodiment, the basic application will need to provide any authentication credentials, such as a bearer token that the trusted application may require.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
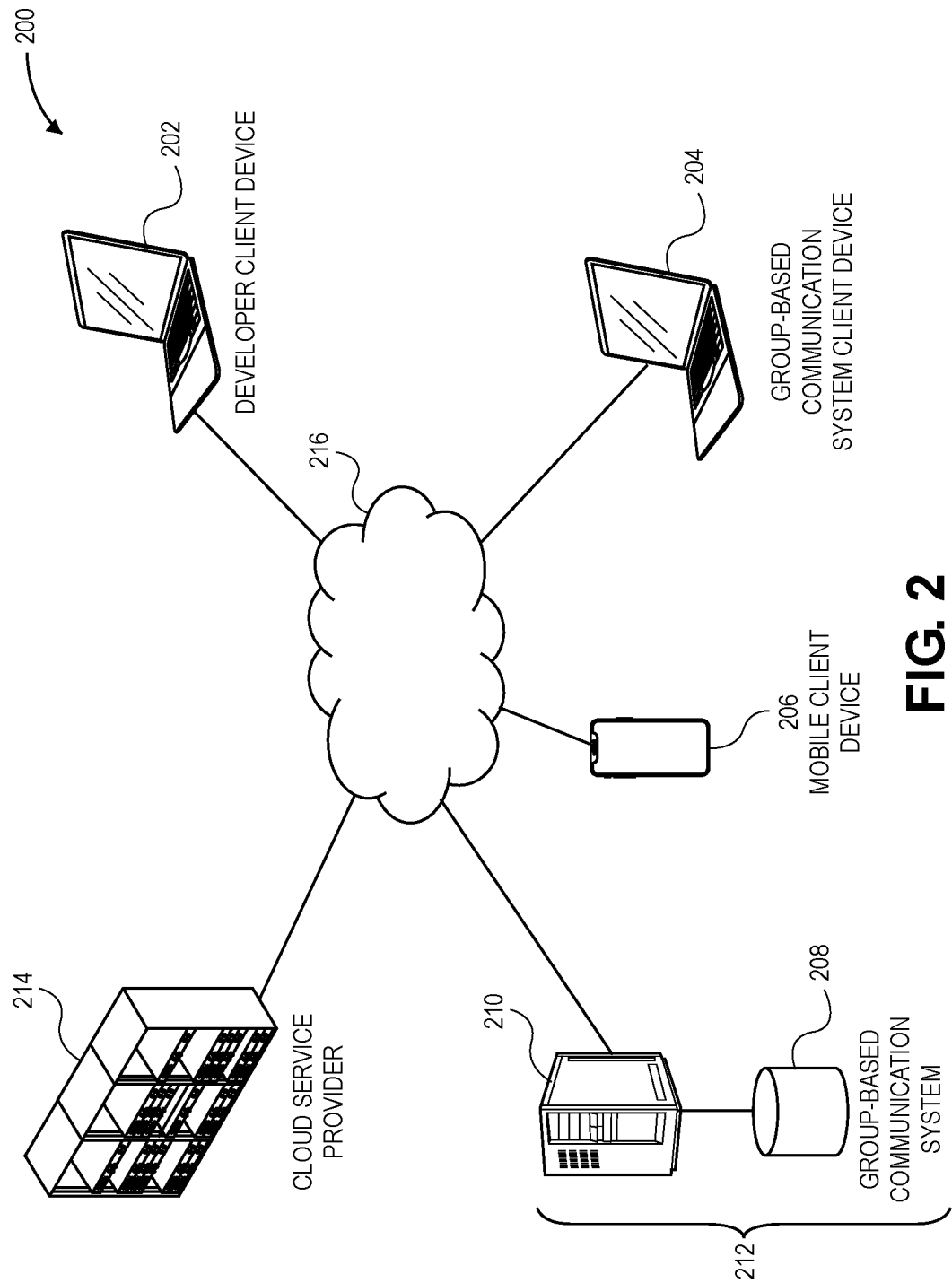
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a platform for building, deploying, running, monitoring, and maintaining event-based applications. System 200 includes any number of client devices such as group-based communication system client device 204, mobile client device 206, and developer client device 202. An individual user may connect to components of system 200 using a single client device or multiple client devices, either concurrently or sequentially. Similarly, in some embodiments, multiple users may share (concurrently or sequentially) a single client device to access the group-based communication system. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, group-based communication system 212 is a channel-based messaging platform that can host a multiplicity of group-based communication system servers and group-based communication data stores such as group-based communication system server 210 and group-based communication data store 208.

In some embodiments, group-based communication system 212 provides services in connection with group-based communication system server 210. Group-based communication system server 210 may be a dedicated server, a shared server, a virtual machine instance in a cloud computing environment, or any other form of computing device discussed above with respect to FIG. 1. Although a single group-based communication system server 210 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons.

Cloud service provider 214 represents an on-demand cloud computing platform providing data storage and computing resources in the form of dedicated servers, shared servers, virtual machine instances in a cloud computing environment, or any other form of computing device discussed above with respect to FIG. 1. Cloud service provider 214 may provide software as a service (SaaS), infrastructure as a service (IaaS) or platform as a service services (PaaS), including serverless execution in an event-driven serverless execution environment. A serverless execution environment may enable the deployment of an application container that is built for a particular execution environment. Broadly, an application container is an isolated instance of a particular application including application code, application configuration resources, and certain associated libraries and application dependencies allowing rapid and independent deployment of that application.

Server 210 is communicatively coupled to client devices 202, 204, and 206 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Group-based communication system server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 208 is communicatively connected to group-based communication system server 210. As depicted, group-based communication system data store 208 is directly connected to group-based communication system server 210; however, any form of communicative connection (for example, network-attached storage (NAS), a network file system (NFS), or cloud-based storage) can be employed. Broadly speaking, group-based communication system data store 208 stores the all of the durable information used by group-based communication system server 210. For example, group-based communication system data store 208 may store all of the messages with their associated channels, documents and images uploaded to particular channels, channel membership information, and/or user information. As previously discussed, multiple group-based communication system servers may be present in system 200. In such embodiments, each group-based communication system server may have its own copy of group-based communication system data store 208. Alternatively, multiple group-based communication system servers may share a single network-attached group-based communication system data store. Alternatively, or in addition, in any of these embodiments, data may be sharded across multiple group-based communication system data stores.

Figure 3:
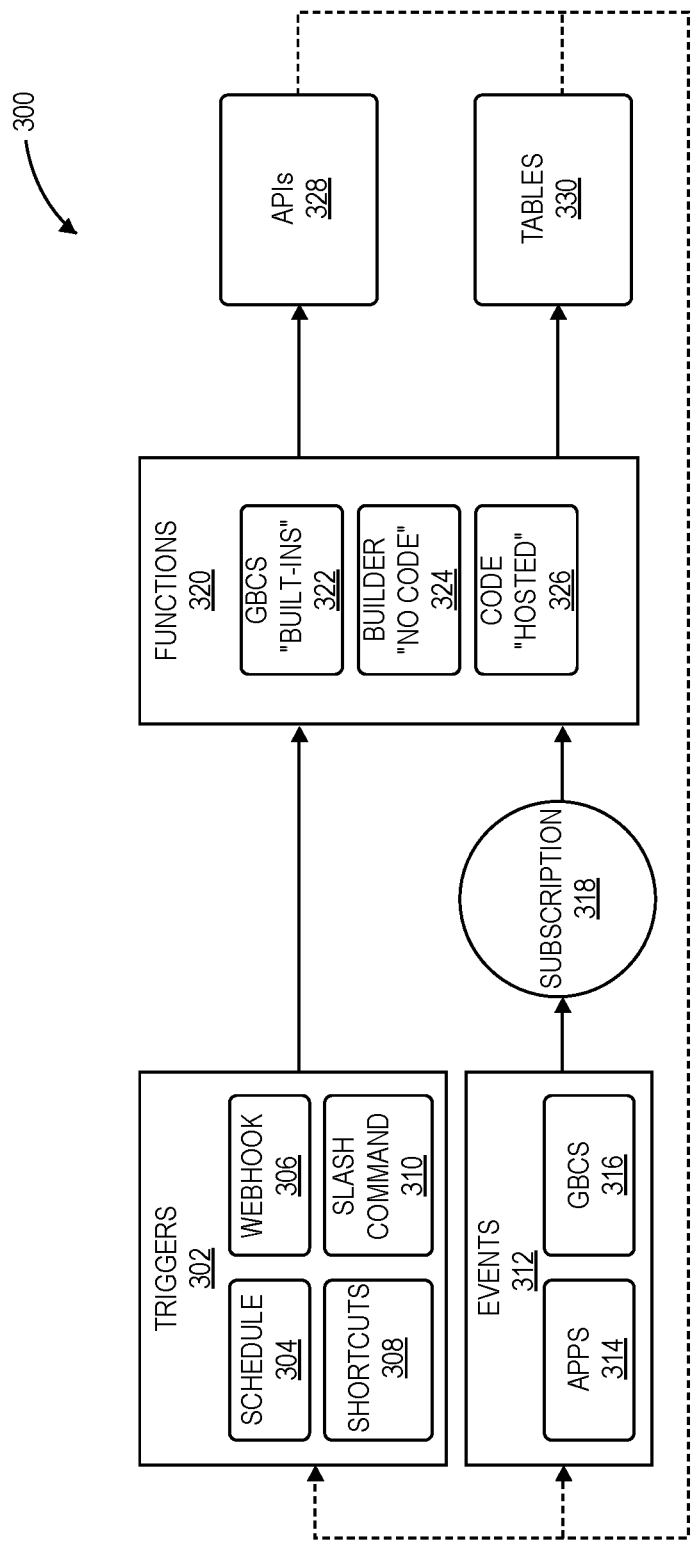
FIG. 3 depicts a block diagram for carrying out embodiments of the invention.

Turning now to FIG. 3, a block diagram for carrying out embodiments of the invention is depicted and referred to generally by reference numeral 300. In various embodiments, triggers 302 are configured to trigger execution of function 320. A trigger initiates application execution and may take the form of a schedule 304, a webhook 306, a shortcut 308, or a slash command 310. In some embodiments, schedule 304 operates like a timer so that a trigger may be scheduled to fire periodically. In some embodiments, an end user of an event-based application sets an arbitrary schedule for the firing of a trigger, such as once-an-hour or every day at 9:15 AM. Additionally, triggers 302 may take the form of webhook 306. Webhook 306 is a software component that listens at a webhook URL and port. In some embodiments, a trigger fires when an appropriate HTTP request is received at the webhook URL and port. In some embodiments, webhook 306 requires proper authentication such as by way of a bearer token. In some embodiments, a payload associated with a particular webhook invocation will contain information to be processed at the webhook prior to causing any trigger to be fired. In some embodiments, one of the triggers 302 will fire any time webhook 306 is invoked and some or all of the payload associated with a particular webhook invocation will be passed on to one or more of functions 320. In some other embodiments, triggering will be dependent on payload content.

Another source of one of triggers 302 is a shortcut in shortcuts 308 associated with a group-based communication system. In some embodiments, shortcuts 308 are global to a group-based communication system or specific to a group-based communication system channel. Global shortcuts are not specific to a group-based communication system channel or workspace. Global shortcuts may be initiated from a shortcuts button in a group-based communication message composer or from within a search interface associated with the group-based communication system client interface. Global shortcuts may trigger functions that are able to execute without the context of a particular group-based communication system message or group-based communication channel. By contrast, message- or channel-based shortcuts are specific to a group-based communication system message or channel and operate in the context of the particular group-based communication system message or group-based communication channel.

A further source of one of triggers 302 may be provided by way of slash commands 310. Slash commands 310 may serve as entry points for group-based communication system functions, integrations with external services, or group-based communication system message responses. In some embodiments, slash commands 310 may be entered by a user of a group-based communication system in order to trigger execution of particular application functionality. A particular slash command may be entered by a user of the group-based communication system directly into a user input component ordinarily used to input group-based communication system messages. In some embodiments, slash commands 310 are distinguishable from a group-based communication system message in that they are preceded by a forward slash ('/'). Slash commands may be followed by slash-command-line parameters which may be passed along to any group-based communication system function that is invoked in connection with the triggering of a group-based communication system function such as one of functions 320.

An additional source of triggers for a function is when an event (such as event 312) matches one or more conditions as predetermined in a subscription (such as subscription 318). Events 312 may be subscribed to by any number of subscriptions 318, and each subscription may specify different conditions and trigger a different function. In some embodiments, events are group-based communication system messages that are received in one or more group-based communication system channels. App events 314 may be group-based communication system messages with associated metadata that are created by an application in a group-based communication system channel. Events 312 may also be direct messages received by one or more group-based communication system users, which may be an actual user or a technical user, such as a bot. A bot is a technical user of a group-based communication system that is used to automate tasks. A bot may be controlled programmatically to perform various functions. A bot may monitor and help process group-based communication system channel activity as well as post messages in group-based communication system channels and react to members' in-channel activity. Bots may have names, profiles, profile photos associated with a group-based communication system. Bots may be referenced in group-based communication system messages and sent direct messages. Bots may be able to post messages and upload files as well as be invited or removed from both public and private channels in a group-based communication system.

Events 312 may also be any event associated with a group-based communication system. Such group-based communication system events 316 include events relating to the creation, modification, or deletion of a user account in a group-based communication system, events relating to messages in a group-based communication system channel, such as creating a message, editing or deleting a message or reacting to a message. Events 312 may also relate to creation, modification, or deletion of a group-based communication system channel or the membership of a channel. Events 312 may also relate to user profile modification or group creation, member maintenance, or group deletion. Events 312 can also be triggered by a change detected by a third-party integration such as the change in the status of a ticket within a third-party incident-management system, for example.

As described above, subscription 318 indicates one or more conditions which, when matched by events, trigger a function. In some embodiments, a set of event subscriptions is maintained in connection with a group-based communication system such that when an event occurs, information regarding the event is matched against a set of subscriptions to determine which (if any) of functions 320 should be invoked. In some embodiments, the events to which a particular application may subscribe are governed by an authorization framework. In one embodiment, the event types matched against subscriptions are governed by OAuth permission scopes which may be maintained by an administrator of a particular group-based communication system.

Functions 320, which are triggered by triggers 302 and subscribed events 312 may be provided in various forms. First, there are group-based communication system "built-ins" 322, which are associated with the core functionality of a particular group-based communication system. Some examples include creating a group-based communication system user or channel. Next are builder "no code" functions 324 that may be developed by a user of a group-based communication system user in connection with a workflow builder user interface as described above. Finally, there are code "hosted" 326 functions which are implemented by way of group-based communication system applications that are developed as software code in connection with a software development environment.

These various types of functions 320 may in turn integrate with APIs 328. In some embodiments, APIs 328 are associated with third-party services that functions 320 employ to provide a custom integration between a particular third-party service and a group-based communication system. Examples of third-party service integrations include video conferencing, sales, marketing, customer service, project management, and engineering application integration. In such an example one of the triggers 302 could be a slash command 310 that is used to trigger a code "hosted" function 326, which makes an API call to a third-party video conferencing provider by way of one of the integrated APIs 328. As shown in FIG. 3 the APIs 328 may themselves also become a source of one or more triggers 302 or events 312. In this example, successful completion of a video conference could trigger a one of the functions 320 that sends a message initiating a further API call to the third-party video conference provider to download and archive a recording of the video conference and store it in a group-based communication system channel.

In addition to integrating with APIs 328, functions 320 may persist and access data in tables 330. In some embodiments tables 330 are implemented in connection with a database environment associated with a serverless execution environment in which a particular event-based application is executing. In one embodiment, tables 330 may be provided in connection with a relational database environment. In other embodiments, tables 330 are provided in connection with a database mechanism that does not employ relational database techniques. As shown in FIG. 3, in some embodiments, reading or writing certain data to one or more of tables 330, or data in table matching predefined conditions is itself a source of one or more triggers 302 or events 312. For example, if tables 330 are used to maintain ticketing data in an incident-management system, then a count of open tickets exceeding a predetermined threshold may trigger a message being posted in an incident-management channel in the group-based communication system.

Figure 4:
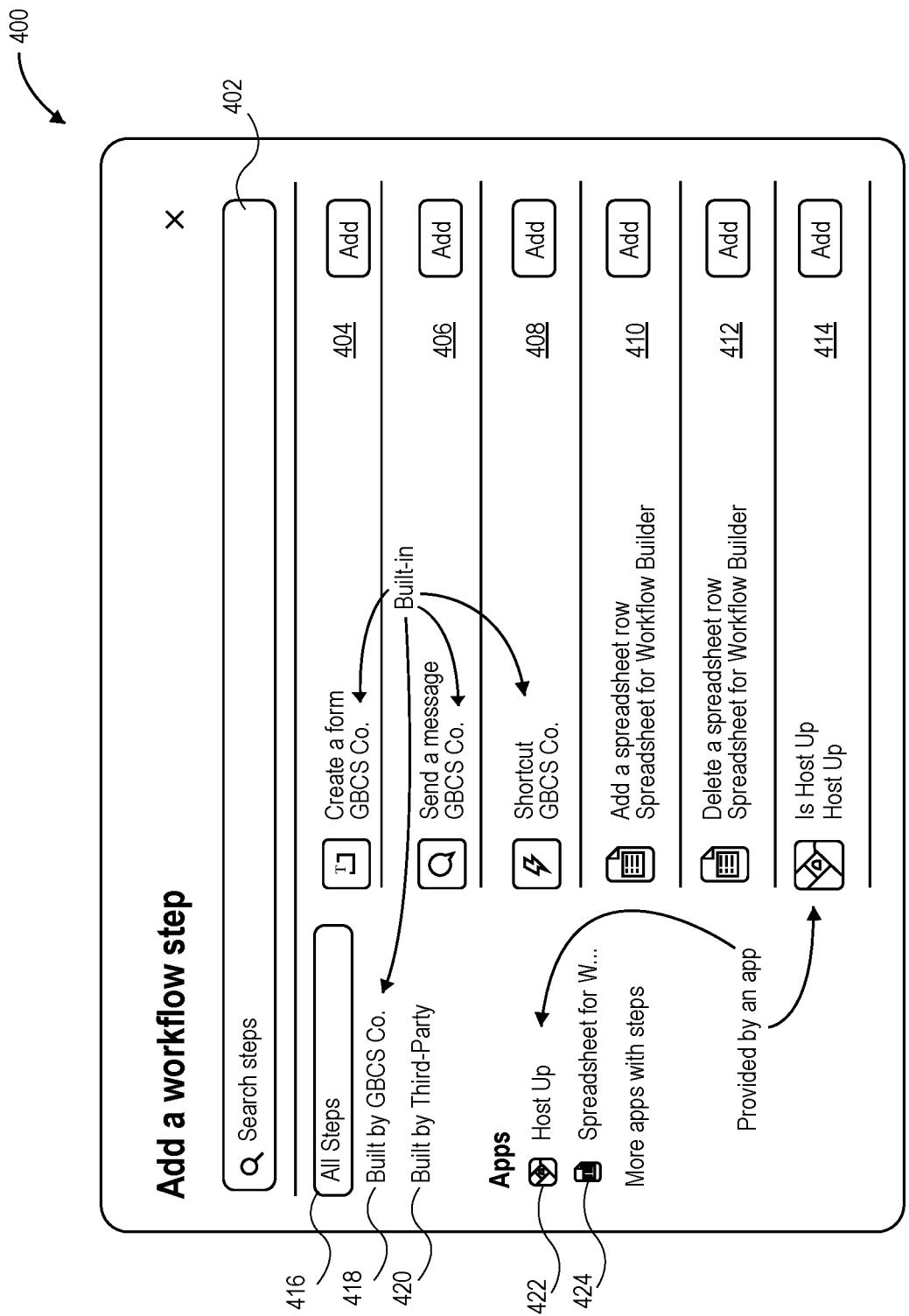
FIG. 4 depicts a user interface component for adding a workflow step in certain embodiments of the invention.

Turning now to FIG. 4, a user interface component for adding a workflow step in certain embodiments of the invention is depicted and referred to generally by reference numeral 400. In various embodiments, a corpus of usable workflow steps is made available to a workflow-building user. In one embodiment, search field 402 is provided so that the workflow-building user may search for a particular workflow step by name or by other characteristic of the workflow step which the workflow-building user needs to perform a particular step within a workflow. The workflow-building user may search for a workflow step in terms of functionality or description of the workflow step, on the basis of an author of the workflow step, or a date range associated with the creation or publishing of the particular workflow step.

In some embodiments, one or more of the listed available workflow steps may be added to a workflow by clicking an "Add" button associated with the respective workflow step. As shown in the example of FIG. 4, various workflow steps may be provided. Workflow step 404 is a step that performs the function of creating a form, which will be displayed to an end user of a group-based communication system and made interactive for use by the end user. Further configuration of workflow step (not shown) may be performed by the workflow-building user once the workflow-building user has clicked to add workflow step 404 to the workflow being built. Workflow step 406 is a step that performs the function of sending a message within the group-based communication system. Workflow step 408 is a shortcut for implementing a group-based communication system shortcut, which is a step that will execute the underlying group-based communication system function associated with the shortcut as configured in the group-based communication system. Workflow steps 404, 406, and 408 are shown to be from "GBCS Co." which, in the illustrated embodiment, is an operator of a particular group-based communication system. These workflow steps are said to be built-in because they are part of the core functionality of the group-based communication system.

In some embodiments, to aid the workflow-building user in filtering available workflow steps, filter criteria are provided. Such filter criteria include empty filter criterion 416 which provides a list of all steps without limitation as indicated. Filter criteria also include filter criterion 418, which limits the display to built-in workflow steps that are provided by GBCS Co. In this embodiment, the filter criteria also include filter criterion 420, which will limit the display to workflow steps that are provided by a third-party application, such as workflow steps 410 and 412, which provide the functionality of adding and deleting a spreadsheet row based on configuration of the workflow step and any current state of the workflow up to that point.

Workflow step 414 is also a step that is exposed by a hosted group-based communication system application that implements and exposes group-based communication system functions within the workflow builder user interface illustrated in FIG. 4. Workflow step 414 is entitled "Is Host Up" and is associated with the group-based application entitled "Host Up." In various embodiments, the workflow-building user may interact with user interface component 400 to filter displayed workflow steps to only those provided by a particular third-party application such application identifiers 422 and 424, which correspond to third-party applications "Spreadsheet for Workflow Builder" and "Host Up" respectively.

Figure 5A:
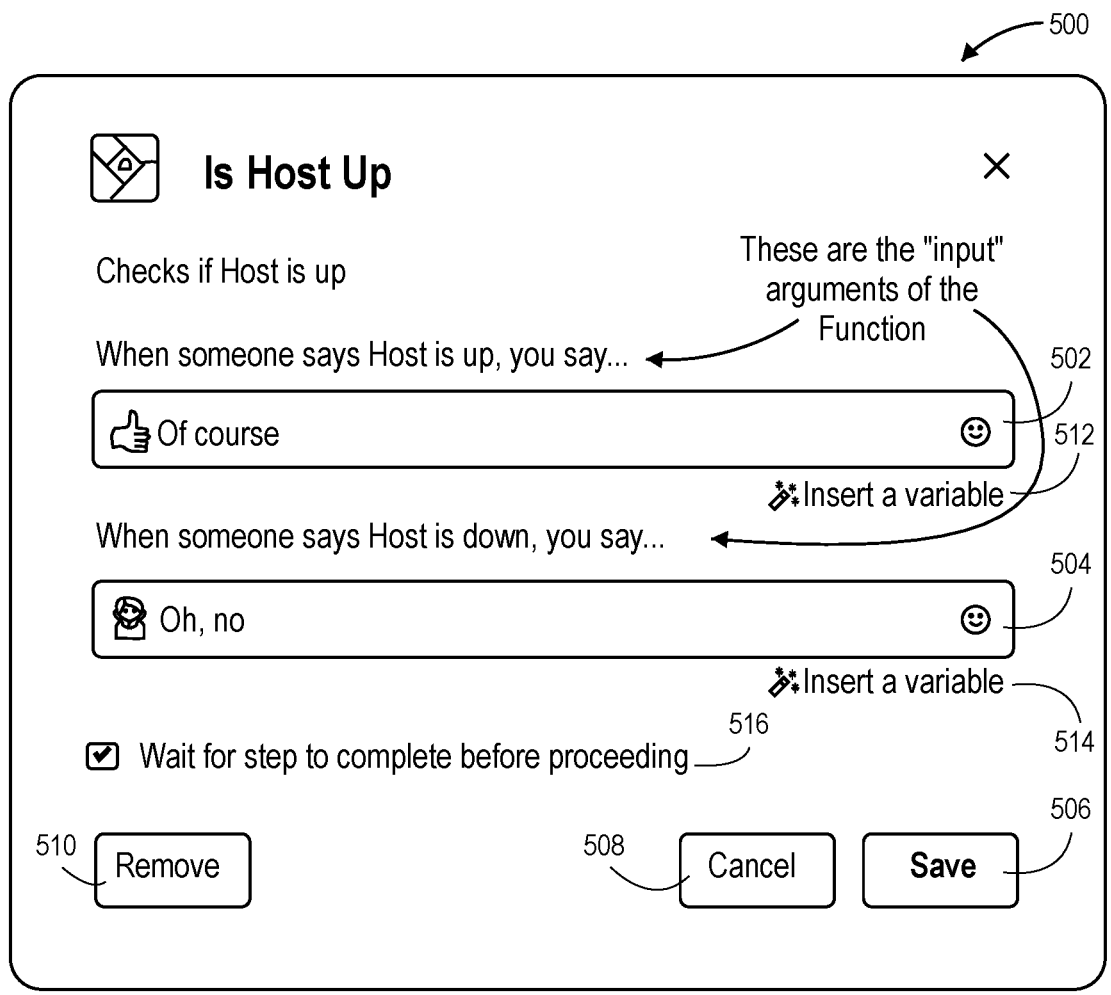
FIG. 5A depicts a user interface component for configuring arguments to a function in certain embodiments of the invention.

Turning now to FIG. 5A, a user interface component for configuring arguments to a function in certain embodiments of the invention is depicted and referred to generally by reference numeral 500. User interface component 500 is presented to a workflow-building user in connection with the workflow-building user having chosen to add workflow step 414 of FIG. 4. FIG. 5A illustrates a step configuration modal dialog box that allows the workflow-building user to further configure the workflow step associated with a function implemented by a hosted application. User input elements 502 and 504 correspond to the input arguments of the function associated with the workflow step being configured in connection with user interface component 500, which checks to see whether a particular Host is operational, or "up." The first argument is entitled "When someone says Host is up, you say . . . " In some embodiments, user input element 502 is a text box into which the workflow-building user has input a thumbs-up emoji and the text "Of course." In one embodiment, the hosted application that exposes a particular function provides default values for user input elements 502 and 504.

In some embodiments, the workflow-building user may select either of insert a variable links 512 and 514 in order to provide a variable instead of a constant string in connection with user input elements 502 and 504. The configuration of user input elements 502 and 504 with a variable is further explained in connection with FIG. 5B below. In various embodiments, check box 516 is provided so that the workflow-building user can specify whether the workflow step should be performed synchronously. If check box 516, which is entitled "Wait for step to complete before proceeding," is checked the workflow step is treated as a synchronous step and workflow execution is blocked until the workflow step is completed. Alternatively, if the checkbox is unchecked, execution is not blocked while the workflow step is executed. In some embodiments, remove button 510, cancel button 508, and save button 506 are provided in user interface component 500. Selecting Remove button 510 removes the workflow step from the workflow. Cancel button 508 cancels the workflow step configuration operation, and Save button 506 saves changes made in connection with the workflow step configuration operation.

Figure 5B:
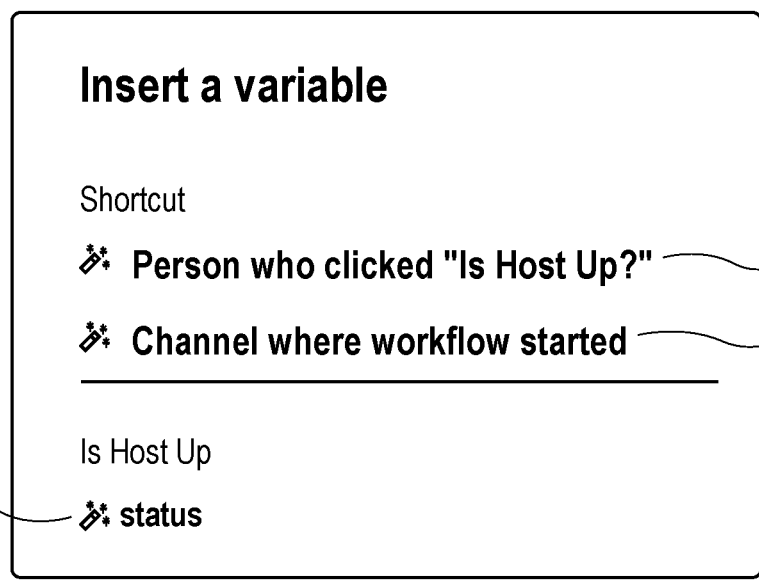
FIG. 5B depicts a user interface component for inserting a variable associated with arguments to a function in certain embodiments of the invention.

Turning now to FIG. 5B, a user interface component for inserting a variable associated with arguments to a function in certain embodiments of the invention is depicted and referred to generally by reference numeral 550. User interface component 550 is presented to a workflow-building user in connection with the workflow-building user having chosen to insert a variable in FIG. 5A. FIG. 5B illustrates an "insert a variable" modal dialog box that allows the workflow-building user to specify a variable to be inserted in connection with configuration of the workflow step associated with a function implemented by a hosted application. In some embodiments, a listing of potential variables to insert associated with a group-based communication system function and workflow are provided. In some embodiments, the variables to be inserted are associated with a shortcut associated with the group-based communication system function being invoked, such exemplary shortcuts are illustrated in FIG. 5A as shortcuts 552 and 554. A variable associated with the function implementing the workflow step is illustrated as variable 556 entitled "status." In some embodiments, right clicking (or providing a long-press gesture) on one of the variables provides additional information regarding the variable. Selecting the variable causes the modal dialog box to be dismissed and inserts the variable into a respective user input associated with a workflow step configuration user interface control such as user interface control 500 of FIG. 5A.

Operation of Embodiments of the Invention

Figure 6:
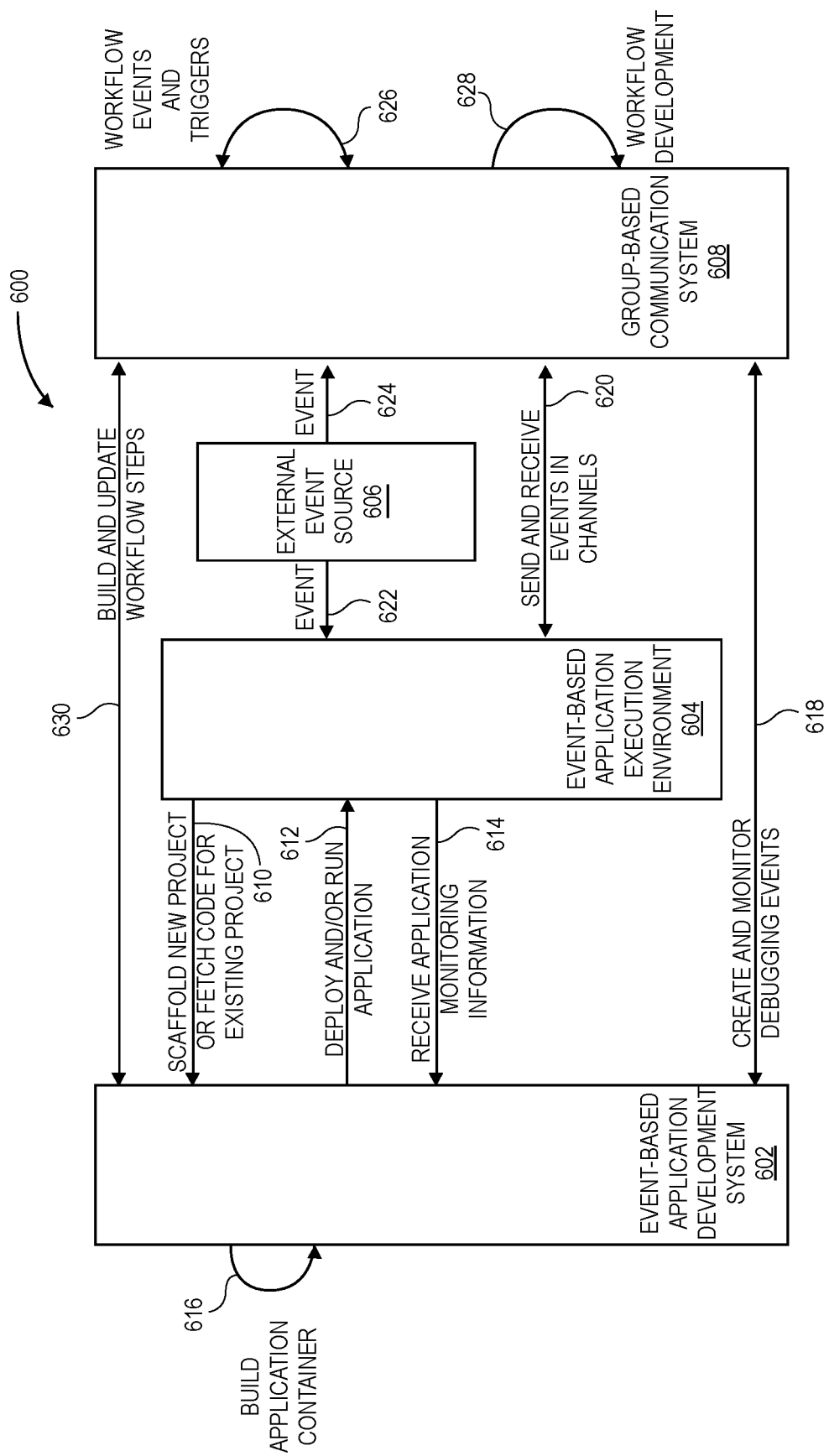
FIG. 6 depicts a data flow diagram for carrying out embodiments of the invention.

Turning now to FIG. 6, a data flow diagram 600 for carrying out embodiments of the invention is depicted. Depicted in data flow diagram 600 is event-based application development environment 602. In some embodiments, event-based application development environment 602 is made up of a source code editor and various other source code development tools. In some embodiments, these tools are installed on a developer device such as developer device 202 of FIG. 2. Alternatively, the event-based application development system can be hosted remotely and a front-end interface provided to a developer so that the developer can interact with event-based application development environment 602.

In addition to event-based application development environment 602, depicted is also event-based application execution environment 604, which is an environment for executing one or more event-based applications. Event-based application execution environment 604 may be hosted in a data center operated by an operator of a group-based communication system. Alternatively, event-based application execution environment 604 may be hosted in a public or private cloud or on-premises in a data center operated by an enterprise that consumes services from a group-based communication system but does not permit hosting of a particular event-based application and associated data outside of a data center operated by the enterprise. In some embodiments, event-based application execution environment 604 is a serverless execution environment hosted in connection with a public or private cloud platform.

Data flow diagram 600 also depicts external event source 606, which is any source of events to potentially be consumed by an event-based application, as described above with respect to FIG. 3. External event source 606 may be a user who inputs a message into a group-based communication system channel. The user may enter a message directly into a group-based communication system channel by inputting text or other data into a client interface associated with the group-based communication system. The user may also cause an event to be generated by clicking on an interactivity interface associated with the client interface by (for example) clicking a button in the interface or otherwise interacting with an interface associated with the group-based communication system. External event source 606 may also be an event-based application that generates one or more output events based on one or more triggering events. External event source 606 may also be an external application such as a news source or a social media site. Group-based communication system 608 is also depicted as both a source and recipient of events within the data flow as well as an interface and execution environment of group-based communication system workflow steps as explained below.

Within the environment of data flow diagram 600, as shown in flow 610, an application developer may scaffold a new project or fetch code for an existing project in the context of development of an event-based application. In some embodiments, this data flows from event-based application execution environment 604, as in the case where skeleton applications are provided in a central location associated with event-based application execution environment 604. This may also be the case when, for example, a source code repository function is also provided by event-based application execution environment 604. It is understood that external source code repositories (not shown) may also be utilized to provide source code control functionality for the application developer. Once the application developer has scaffolded a skeleton application or fetched an existing project, the application developer may debug or add functionality to the event-based application. In some embodiments, an emulator or simulation of an application execution environment is provided in connection with the event-based application development environment 602 such that the application developer can iteratively develop the event-based application. Alternatively, any time a file is changed in a set of files associated with the event-based application, the event-based application is deployed onto the event-based application execution environment 604.

Flow 612 illustrates this deploy and/or run instruction. In some embodiments, deploying an event-based application into event-based application execution environment 604 involves creating an application if not already created based on an application configuration metadata. Alternatively, the application is updated based on updated application source code and application configuration metadata. In some embodiments, if an application icon file associated with the event-based application has changed since the last deployment, the application icon file is preprocessed and uploaded to the application execution environment. Preprocessing involves centering and cropping the icon according to application icon sizing requirements such as icon file size and dimensions. In some embodiments, source code is bundled and uploaded to the application execution environment hosting platform. If an execution environment associated with the event-based application has not yet been provisioned, the execution environment is provisioned. In some embodiments, an application container is built at flow 616 prior to deployment to an application execution environment.

At flow 618, the application developer creates and monitors debugging events to test the event-based application in the course of application development. This may involve using an API associated with the group-based communication system to implement an application testing suite with predefined inputs and corresponding associated expected outputs. Once deployed, whether in development or production, the event-based application receives events, processes them and produces outputs corresponding to application logic implemented by the event-based application.

Figure 7:
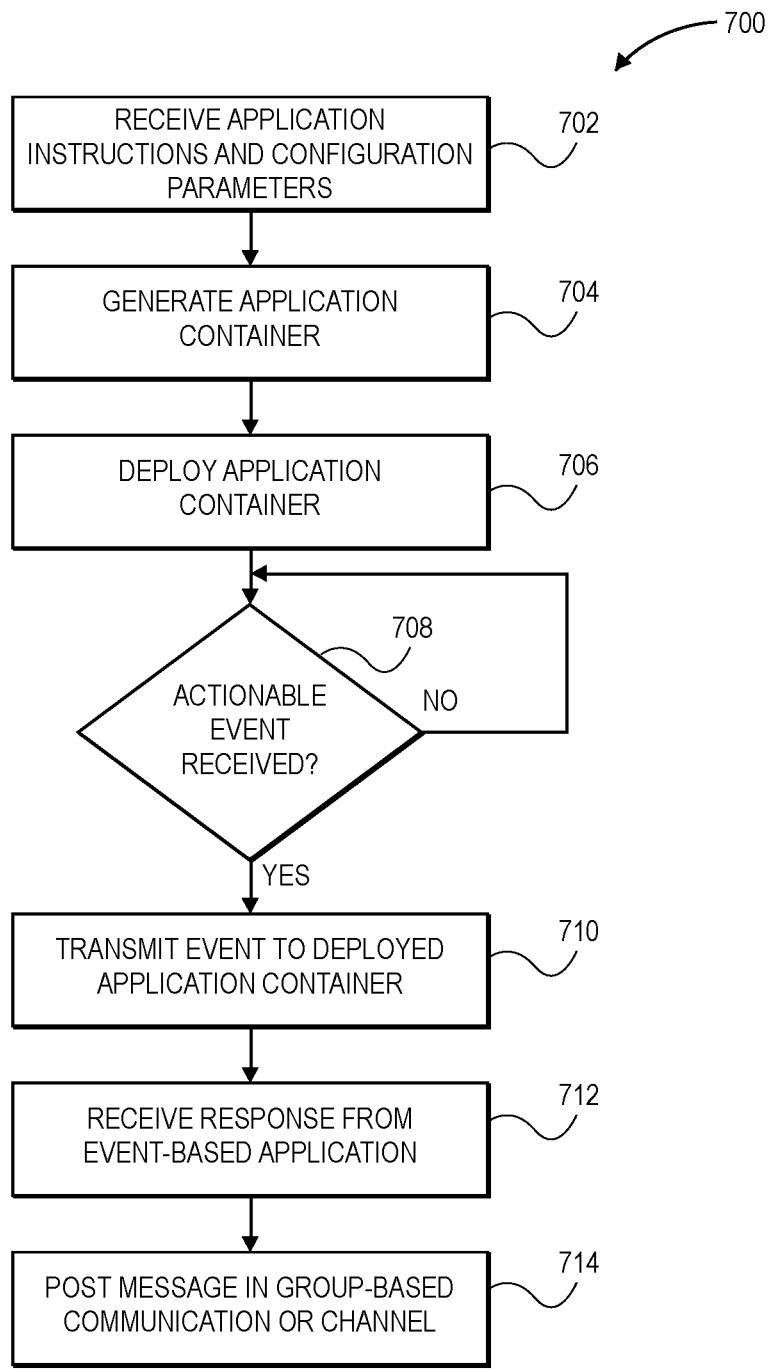
FIG. 7 depicts an exemplary flow chart for illustrating the operation of a method in accordance with one embodiment of the invention.

Turning now to FIG. 7, an exemplary flow chart 700 for illustrating the operation of a method in accordance with one embodiment of the invention is depicted. In various embodiments, an application developer works in a development environment to develop source code that provides the basis for an event-based application. The application developer inputs source code instructions and application metadata, such as application configuration parameters in application configuration files. In some embodiments, the source code instructions are provided in the form of source code files in a scripting language such as one of the languages of the ECMAScript family of programming languages. In other embodiments, the source code instructions are provided in the form of uncompiled or pre-compiled source code in a compiled programming language. In some embodiments, the application configuration parameters are provided in the form of YAML configuration files. In other embodiments, another markup language (such as JSON or XML) is used. In some embodiments, data files that make up the application instructions and configuration parameters are packaged up into an archive for transmission as a single data file. In some other embodiments, the files may be transmitted individually to a hosting environment. At step 702, these application instructions and configuration parameters are received. In some embodiments, the application instructions and configuration parameters are received by an intermediate processing program associated with the development environment, which may run on a development client device of the application developer, such as development device 202 of FIG. 2. In various embodiments, the application instructions are designed to operate on certain events as the events are received in a group-based communication system.

Next, at step 704, an application container is generated based on the application instructions and application configuration parameters. As used herein, an application container is a unit of software that packages up code and dependencies, such as libraries, so the application can be deployed seamlessly and reliably from one application execution environment to another. In some embodiments, an application container image is a lightweight, standalone, package of software and configuration metadata that includes everything needed to run the application given a particular container runtime. A container runtime is an execution environment that can run a particular category of application containers. In some embodiments, an application container is a virtual machine image that can be executed in any virtual machine execution environment.

Next, at step 706, the application container is deployed into an application execution environment. In some embodiments, the application container is transferred over a network to a remote data center hosting either a public or private cloud. In some testing environments, the execution environment may be an application execution environment residing on the application developer's development device. In some embodiments, the application execution environment is hosted by an operator of a group-based communication system, either in a data center operated by the operator of the group-based communication system or another public or private cloud. In some other embodiments, the application execution environment is hosted on-premises in a data center operated by an enterprise that consumes services from a group-based communication system but does not permit hosting of a particular event-based application and associated data outside of a data center operated by the enterprise. In some embodiments, deployment of the application container also entails initiating execution of processes associated with the event-based application. In this embodiment, the event-based application listens at a webhook URL and port associated with a public IP address. In some other embodiments, the event-based application is merely deployed and will not execute until a relevant event is received at a group-based communication system.

Continuing to test 708, once the event-based application has been deployed, a monitoring process determines whether an actionable event has been received in connection with one or more group-based communication system channels associated with a group-based communication system. In some embodiments, the criteria by which it may be determined whether an actionable event has been received are based on a configuration of one or more triggers. A trigger may be a description of an event that should be routed to a particular function associated with an event-based application, as generally described above with respect to FIG. 3. If no actionable event is received the monitoring continues to wait for an actionable event to be received. If, at test 708, an actionable event has been received, execution proceeds to step 710.

At step 710, the actionable event is transmitted to an appropriate deployed application container. In some embodiments, this involves the group-based communication system detecting that a trigger has occurred such that certain conditions associated with the trigger have been satisfied by a message or other event that has taken place in connection with a group-based communication system. In some embodiments, this may be the receipt of a message or other group-based communication object received in a group-based communication system channel. Broadly speaking, an event described above with respect to FIG. 3 is contemplated as being processed at step 710. In some embodiments, the event is formatted by the group-based communication system as a JSON object and transmitted to the event-based application by posting an HTTP transmission to the webhook URL associated with the event-based application. In these embodiments, the HTTP transmission is an indication that an actionable event has been received and that it should trigger execution of the event-based application.

Next, at step 712, a group-based communication system receives a response responsive to the event transmitted in the previous step. In some embodiments, the response is a composite output associated with functions contained within the event-based application and comprising application logic associated with the group-based communication system. In some embodiments, execution of the application logic associated with the event-based application will have effected various side effects, such as opening a video conference session or writing data to a data persistence store.

Finally, at step 714, based on the response, a message is posted in a respective group-based communication system channel. In some embodiments, the posted message is itself an event that may trigger further processing in the event-based application or in another event-based application. In some other embodiments, the posted message may contain interactive attributes that, when further acted upon by users of the group-based communication system, cause further events to trigger further execution by one or more event-based applications associated with the group-based communication system.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for hosting an application in connection with a group-based communication system, the method comprising:
   receiving, from a development environment, application instructions and application configuration parameters associated with the application corresponding to processing steps to be performed in response to at least one group-based communication system event,
   wherein the at least one group-based communication system event is associated with a group-based communication system channel of the group-based communication system;
   building an application container based on the application instructions and the application configuration parameters;
   deploying the application container into a third-party cloud computing environment that is distinct from the group-based communication system; and
   in response to detecting the at least one group-based communication system event in the group-based communication system channel of the group-based communication system:
      transmitting, from the group-based communication system and to the application container deployed into the third-party cloud computing environment, an indication comprising the at least one group-based communication system event and metadata associated with the at least one group-based communication system event;
      based on the indication, triggering execution by the third-party cloud computing environment of the application instructions, thereby generating an execution result responsive to at least one group-based communication system event;
      receiving, by the group-based communication system and from the application container deployed into the third-party cloud computing environment, the execution result; and
      posting, in the group-based communication system channel, a message based on the execution result.

2. The one or more non-transitory computer-readable media of claim 1, wherein a video conference session is initiated based on the execution result.

3. The one or more non-transitory computer-readable media of claim 1, wherein the message is posted in a different group-based communication system channel.

4. The one or more non-transitory computer-readable media of claim 1, wherein the application container is deployed responsive to a determination that a deploying user of the group-based communication system has authorization to deploy cloud-based applications.

5. The one or more non-transitory computer-readable media of claim 1, wherein execution of the application instructions in response to the at least one group-based communication system event further comprises:
   storing data, via a persistence application programming interface, in a data persistence service accessible to the third-party cloud computing environment.

6. The one or more non-transitory computer-readable media of claim 5, wherein storing data in a data persistence service comprises storing data into predefined portions of a data persistence table and causing further events to be generated in the group-based communication system channel of the group-based communication system.

7. The one or more non-transitory computer-readable media of claim 1, wherein an administrative interface associated with the application defines application programming interface access permissions based on an associated network destination.

8. A method for hosting an application in connection with a group-based communication system, the method comprising:
   receiving, from a development environment, application instructions and application configuration parameters associated with the application corresponding to processing steps to be performed in response to at least one group-based communication system event,
   wherein the at least one group-based communication system event is associated with a group-based communication system channel of the group-based communication system;

building an application container based on the application instructions and the application configuration parameters;

deploying the application container into a third-party cloud computing environment that is distinct from the group-based communication system; and in response to detecting the at least one group-based communication system event in the group-based communication system channel of the group-based communication system:

transmitting, from the group-based communication system and to the application container deployed into the third-party cloud computing environment, an indication comprising the at least one group-based communication system event and metadata associated with the at least one group-based communication system event;

triggering execution by the third-party cloud computing environment of the application instructions based on the indication to generate an execution result responsive to at least one group-based communication system event;

receiving, by the group-based communication system and from the application container deployed into the third-party cloud computing environment, the execution result; and posting, in the group-based communication system channel, a message based on the execution result.

9. The method of claim 8, wherein a video conference session is initiated based on the execution result.

10. The method of claim 8, wherein the message is posted in a different group-based communication system channel.

11. The method of claim 8, wherein the application container is deployed responsive to a determination that a deploying user of the group-based communication system has authorization to deploy cloud-based applications.

12. The method of claim 8, wherein execution of the application instructions in response to the at least one group-based communication system event further comprises:

storing data, via a persistence application programming interface, in a data persistence service accessible to the third-party cloud computing environment.

13. The method of claim 8, wherein storing data in a data persistence service comprises storing data into predefined portions of a data persistence table and causing further events to be generated in the group-based communication system channel of the group-based communication system.

14. The method of claim 13, wherein an administrative interface associated with the application defines application programming interface access permissions based on an associated network destination.

15. A system comprising at least one processor and at least one non-transitory memory storing computer executable instructions that when executed by the at least one processor cause the system to carry out actions comprising:

receiving, from a development environment, application instructions and application configuration parameters associated with an application corresponding to processing steps to be performed in response to at least one group-based communication system event, wherein the at least one group-based communication system event is associated with a group-based communication system channel of a group-based communication system;

building an application container based on the application instructions and the application configuration parameters;

deploying the application container into a third-party cloud computing environment that is distinct from the group-based communication system; and in response to detecting the at least one group-based communication system event in the group-based communication system channel of the group-based communication system:

transmitting, from the group-based communication system and to the application container deployed into the third-party cloud computing environment, an indication comprising the at least one group-based communication system event and metadata associated with the at least one group-based communication system event;

triggering execution by the third-party cloud computing environment of the application instructions based on the indication to generate an execution result responsive to at least one group-based communication system event;

receiving, by the group-based communication system and from the application container deployed into the third-party cloud computing environment, the execution result; and posting, in the group-based communication system channel, a message based on the execution result.

16. The system of claim 15, wherein a video conference session is initiated based on the execution result.

17. The system of claim 15, wherein the message is posted in a different group-based communication system channel.

18. The system of claim 15, wherein the application container is deployed responsive to a determination that a deploying user of the group-based communication system has authorization to deploy cloud-based applications.

19. The system of claim 15, wherein execution of the application instructions in response to the at least one group-based communication system event further comprises:

storing data, via a persistence application programming interface, in a data persistence service accessible to the third-party cloud computing environment.

20. The system of claim 19, wherein storing data in a data persistence service comprises storing data into predefined portions of a data persistence table and causing further events to be generated in the group-based communication system channel of the group-based communication system.

* * * * *